US012717279B2

(12) United States Patent
Bravo et al.

(10) Patent No.: US 12,717,279 B2
(45) Date of Patent: Aug. 25, 2026

(54) DEVICE FOR AUTONOMOUS ADJUSTMENT OF THE ACTIVE LENGTH OF A SPIRAL

(71) Applicant: The Swatch Group Research and Development Ltd, Marin (CH)

(72) Inventors: Paulo Bravo, Marin-Epagnier (CH); Andres Cabezas Jurin, Yverdon-les-Bains (CH)

(73) Assignee: The Swatch Group Research and Development Ltd, Marin (CH)

( * ) Notice: Subject to any disclaimer, the term of this patent is extended or adjusted under 35 U.S.C. 154(b) by 296 days.

(21) Appl. No.: 18/426,573

(22) Filed: Jan. 30, 2024

(65) Prior Publication Data

US 2024/0302794 A1 Sep. 12, 2024

(30) Foreign Application Priority Data

Mar. 6, 2023 (EP) .................................... 23160130

(51) Int. Cl.
*G04B 17/06* (2006.01)
*G04B 17/24* (2006.01)

(52) U.S. Cl.
CPC ........... *G04B 17/063* (2013.01); *G04B 17/24* (2013.01)

(58) Field of Classification Search
CPC .. G04B 17/063; G04B 18/023; G04B 18/028; G04B 18/06; G04B 17/32
See application file for complete search history.

(56) References Cited

U.S. PATENT DOCUMENTS

| | | | | |
|---|---|---|---|---|
| 2006/0062088 A1* | 3/2006 | Hintze | ................. | G04B 18/023 368/175 |
| 2019/0187618 A1* | 6/2019 | Bravo | .................. | G04B 17/063 |
| 2022/0091562 A1* | 3/2022 | Winkler | ................. | G04B 31/02 |

FOREIGN PATENT DOCUMENTS

| | | | |
|---|---|---|---|
| EP | 3 081 996 A1 | 10/2016 | |
| EP | 2980658 B1 * | 7/2017 | ........... G04B 17/325 |
| EP | 3 502 788 A1 | 6/2019 | |
| JP | 2016133312 A * | 7/2016 | |

OTHER PUBLICATIONS

European Search Report for EP 23 16 0130 dated Jul. 11, 2023.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A device (6) for autonomous adjustment of the active length of a spiral (5), for oscillators (4, 5) of the balance-spiral type, comprising a cock (12) mounted on a plate (13) of a horological movement (2) and in which a balance shaft pivots, the spiral (5) including an inner end secured to the balance shaft and an outer end secured to a balance spring stud (8) fastened to a balance spring stud holder (10), the balance spring stud holder (10) being pivotably mounted on the cock (12) concentrically to the balance shaft, and means for modifying the active length of the spiral (5).

18 Claims, 2 Drawing Sheets

DEVICE FOR AUTONOMOUS ADJUSTMENT OF THE ACTIVE LENGTH OF A SPIRAL

CROSS REFERENCE TO RELATED APPLICATIONS

This application is claiming priority based on European Patent Application No. 23160130.3 filed on Mar. 6, 2023.

TECHNICAL FIELD OF THE INVENTION

The invention relates to a device for autonomous adjustment of the active length of a spiral, for a balance-spiral type oscillator.

The invention also relates to a horological movement including the device for autonomous adjustment of the active length of a spiral and a balance-spiral type oscillator.

The invention also relates to a timepiece, in particular a watch, including the horological movement.

TECHNOLOGICAL BACKGROUND

In the field of watches equipped with mechanical oscillators of the balance-spiral type, there are known mechanisms for manually adjusting the active length of the spiral.

For example, in common manual adjustment mechanisms, the outer end of the spiral is immobilised by a balance spring stud secured to a balance spring stud holder secured to a cock. A moving index rotating relative to the balance spring stud holder is intended to adjust the active length of the spiral, thereby allowing adjusting the frequency of the balance-spiral. The index is a lever, usually equipped with two arms, which pivots centrally on the coordinate of the balance shaft. For example, a first arm of the index carries two pins between which the spiral is free. A second arm of the index can be manually operated to make the index pivot by a given angle around the balance shaft. This allows modifying the actual position of the counting point. When the index pivots, the active length of the spiral is reduced or increased. Nonetheless, a drawback of such a manual adjustment device is that the Earth's gravity influences the frequency of oscillations of the balance-spiral depending on the orientation of the corresponding horological movement. Thus, running of a watch could have a significant running deviation between its horizontal and vertical positions, in particular. Furthermore, when the spiral moves between the pins due to the clearance between these, the oscillations of the balance-spiral cause a disturbance of its active length and therefore a slight variation in the frequency of the oscillations of the balance-spiral assembly.

In order to limit the negative effects of gravity, it is known, in particular from the patent document CH 705 605 B1, a solution implementing a device for adjusting the active length of the spiral, wherein the index carries clamping means intended to clamp a terminal portion of the spiral to define the active length of the latter. The outer end of the spiral is further secured to a fastening system mounted movable relative to the index and arranged to cooperate with it. The clamping means, for example consisting of a pin-eccentric clamping system in which the terminal portion of the spiral is clamped, may be freely loosened or tightened by a watchmaker. Once the watchmaker has loosened the pin-eccentric clamping system, he can move the fastening system by means of a tool, thereby allowing moving the spiral relative to the index which remains fixed, and thus relative to the pin, which allows modifying the active length of the spiral. The watchmaker can then clamp the spiral against the pin by tightening the clamping system, to reset the adjustment device in the service position. Nonetheless, such a solution remains a manual adjustment solution, which has the drawback of considerably limiting the accuracy of the adjustment to counteract the effects of gravity. Furthermore, such a solution is time-consuming to implement, due to the different steps of manual adjustment by a watchmaker allowing adjustment.

SUMMARY OF THE INVENTION

Hence, the invention aims to provide a device for adjusting the active length of a spiral, for oscillators of the balance-spiral type, allowing counteracting the effects of gravity, in particular disturbances of the isochronism of the balance of the oscillator, in a simple, accurate and autonomous manner, and alleviating the aforementioned drawbacks of the prior art.

To this end, the invention relates to a device for autonomous adjustment of the active length of a spiral, for oscillators of the balance-spiral type, comprising a cock mounted on a plate of a horological movement and in which a balance shaft pivots, the spiral including an inner end secured to the balance shaft and an outer end secured to a balance spring stud fastened to a balance spring stud holder, the balance spring stud holder being pivotably mounted on the cock concentrically to the balance shaft, and means of modifying the active length of the spiral.

According to the invention, the means for modifying the active length of the spiral comprise:

- at least one arm capable of moving between a rest position and a correction position of the device, the at least one arm having a first free end and a second end cooperating with a first pair of pins mounted on the balance spring stud holder, the first pair of pins being angularly offset with respect to the first balance spring stud;
- a movable inertia block rotating around a shaft on which at least one cam is mounted, the inertia block being arranged to rotate freely around the shaft as a function of gravity, the rotation of the inertia block causing a rotation of the at least one cam and a movement of the arm to act on the spiral and simultaneously modify the active length of the spiral;
- elastic constraint means configured to exert an elastic action on the at least one arm to return it in position;
- damping means comprising a gearwheel coaxial with the inertia block and mounted on the inertia block, and a damping device arranged to cooperate with the inertia block via the gearwheel and limit the modification of the active length of the spiral in the event of a sudden acceleration or deceleration.

According to other advantageous alternative embodiments of the invention:

- the device comprises a second arm capable of moving between a rest position and a correction position of the device, the second arm having a first free end and a second end cooperating with a second pair of pins mounted on the balance spring stud holder, the second pair of pins being angularly offset with respect to the first pair of pins and to the balance spring stud;
- the device comprises a second cam arranged to cooperate with the second arm;
- the cams are radial cams with an external profile;
- the cams are angularly offset with respect to each other;
- in the rest position of the device, a planar portion of each cam is in contact with an arm, and, in the correction position of the device, a wedge or angle of the cam is in contact with one of the arms;

the cams are in permanent contact with the free end of each arm regardless of the position of the inertia block;

the free end of the first arm comprises elastically deformable adjustment means, the adjustment means being in the form of a spring leaf a first end of which is secured to the arm and a second end is free, the free end being arranged to be biased and adjust the length of the first arm;

the free end of the second arm comprises elastically deformable adjustment means, the adjustment means being in the form of a spring leaf a first end of which is secured to the arm and a second end is free, the free end being arranged to be biased and adjust the length of the second arm;

the device comprises means for adjusting the elastic stress, the adjustment means being in the form of a screw, the screw passing through the free end and bearing against the arm;

the first pair of pins is fastened to the balance spring stud holder via a first support, the arm being arranged so that it slides between the two pins and comes into contact with the outer coil of the spiral in the correction position;

the second pair of pins is fastened to the balance spring stud holder via a second support, the arm being arranged so that it passes between the two pins and comes into contact with the outer coil of the spiral in the correction position;

the inertia block is a solid half-disc;

the device comprises an air damper, the damper being in the form of a body with a cavity with a shape similar to that of the inertia block, the inertia block being arranged to pivot in the cavity;

the device comprises a heart-shaped cam mounted on the shaft, the heart-shaped cam being arranged to cooperate with a spring, the assembly forming a device for resetting the position of the first and second arms;

the heart-shaped cam is superimposed on the cams.

An advantage of the adjustment device according to the invention is that it comprises an inertia block freely rotatable and cooperating indirectly with a movable arm arranged to act on the outer coil of the spiral. A rotation of the inertia block, freely subjected to gravity, thus causes a movement of the arm, between a rest position and a correction position of the device, and simultaneously acts on the spiral to modify the active length of the spiral, allowing adjusting the latter in order to compensate for the disturbances of the isochronism of the balance due to gravity. Therefore, the adjustment device according to the invention allows accurately compensating for running of the oscillator according to its position in space, by counteracting the disturbances of the isochronism of the balance due to gravity, and that being so autonomously.

The invention also relates to a horological movement including the above-described adjustment device, and which comprises the features mentioned in the dependent claim 17.

The invention also relates to a timepiece including the above-described horological movement, and which comprises the features mentioned in dependent claim 18.

Other features and advantages of the present invention will become apparent in the following description of a preferred embodiment, presented by way of non-limiting example with reference to the appended drawings.

BRIEF DESCRIPTION OF THE FIGURES

The purposes, advantages and features of the device for adjusting the active length of a spiral, as well as the horological movement and the timepiece comprising it, will appear better in the following description based on at least one non-limiting embodiment illustrated by the drawings in which.

DETAILED DESCRIPTION OF THE INVENTION

In the following description, reference is made to a horological movement equipped with a device for adjusting the active length of a spiral, for oscillators of the balance-spiral type. The usual components of the horological movement, which are well known to a person skilled in the art in this technical field, are described only in a simplified form or not described at all. Indeed, a skilled person will be able to adapt these different components and have them cooperate for the operation of the horological movement. In particular, everything concerning the escapement mechanism of the horological movement will not be described later on, although such an escapement mechanism could advantageously cooperate with the adjustment device according to the invention.

Figure 1:
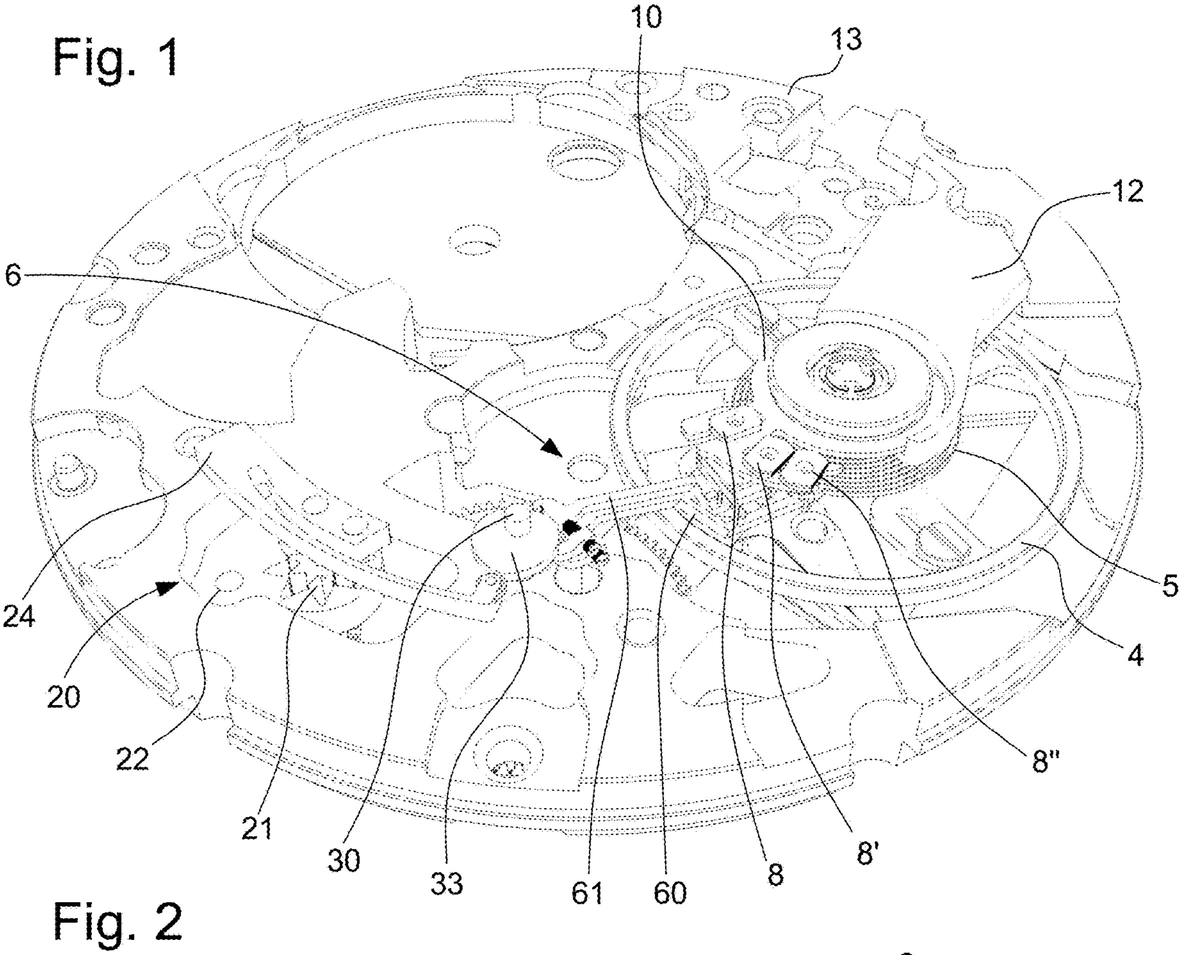
FIG. 1 is a perspective view of a horological movement of a watch comprising a device for adjusting the active length of a spiral according to the invention.
Figure 2:
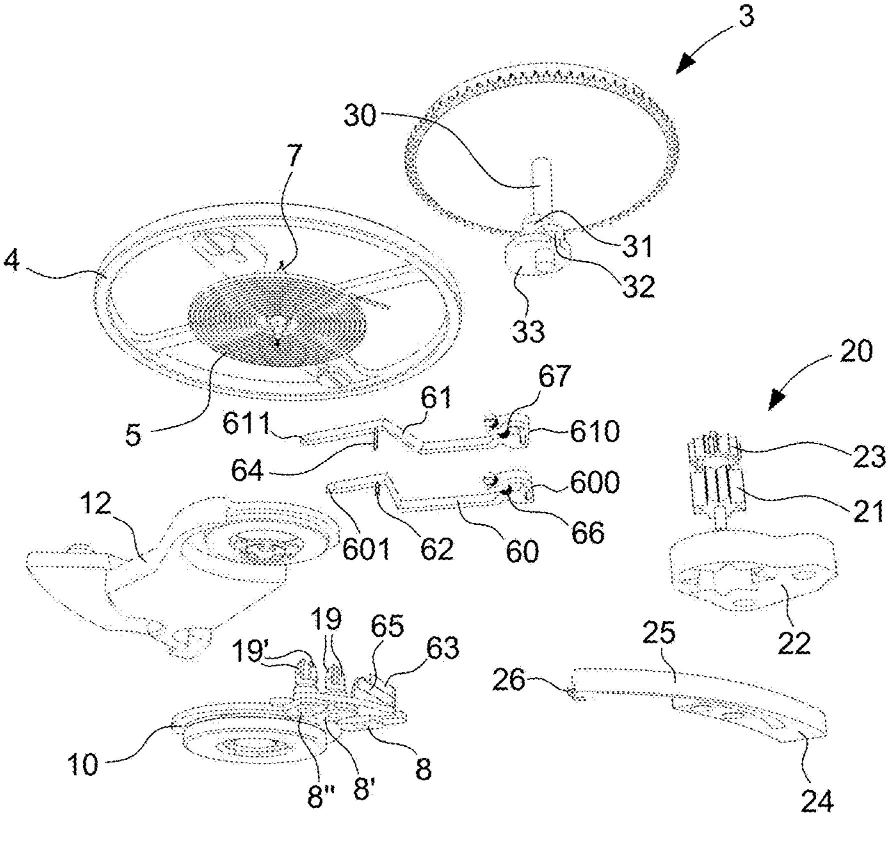
FIG. 2 an exploded perspective view of the adjustment device of FIG. 1.

FIG. 1 depicts a portion of a timepiece 1, which comprises a horological movement 2. In the particular embodiment of FIG. 1, the timepiece 1 is a watch. The horological movement 2 includes an oscillator equipped with a balance 4 and a spiral 5, and a device 6 for independent adjustment of the active length of the spiral 5. Conventionally, the spiral 5 is fastened to a shaft 7 of the balance 4 by its inner end (not visible). The shaft 7 of the balance 4 has a pivotably mounted end in a balance bridge (the latter is not visible in the figures for clarity). The outer end of the spiral 5 is conventionally fastened to a balance spring stud 8 fastened to a balance spring stud holder 10, the balance spring stud holder 10 being secured to a cock 12 by slight tightening. More specifically, the balance spring stud holder is pivotably mounted on the cock 12 concentric to the shaft 7 of the balance 4, as illustrated in FIG. 2. The shaft 7 of the balance 4 is pivotably mounted 10 in the cock 12.

The means for modifying the active length of the coil 5 are capable of modifying the active length of the coil 5 by acting on the length of the outer coil of the spiral 5.

In a particular embodiment illustrated in FIG. 2, the means for modifying the active length of the spiral 5 include at least one arm 60 capable of moving between a rest position and a correction position of the device, the at least one arm having a first free end 600 and a second end 601 cooperating with a first pair of pins 19 forming a guiding fork for the first arm 60, the first pair of pins 19 being mounted on the stud-holder 10 via a first support 8' and offset angularly relative to the stud 8. Thus, the second end 601 of the first arm 600 can slides between the first pair of pins 19.

The means for modifying the active length of the spiral also comprise an inertia block 40 movable in rotation about an axis 41 on which at least one first cam 31 is mounted against which the free end 600 of the at least one arm rests. The inertia block 40 is arranged to be able to rotate about the axis 41 according to the gravity to which it is subjected, the rotation of the inertia block 40 causing a rotation of the at least one cam 31, 32 and a movement of the at least one arm 60, 61 to act on the outer coil of the spiral and simultaneously modify the active length of the spiral.

The adjustment device 6 further comprises damping means comprising a gearwheel 34 coaxial with the inertia block 40 and secured to the inertia block, and a damping device 20 arranged to cooperate with the inertia block 40 via the gearwheel 34 and limit the modification of the active length of the spiral 5 in the event of a sudden acceleration or deceleration.

The adjustment device comprises elastic biasing means configured to exert an elastic action on the at least one arm 60 to return it in position. The elastic biasing means are in the form of a rod 62 secured to the arm 60 and a spring leaf 63 secured to the balance spring stud holder 10, the spring leaf 61 exerting a return force on the rod 62 to exert an elastic action on the arm 60 for returning it in position.

Preferably, the adjusting device comprises a second arm 61 capable of moving between a rest position and a correction position of the device, the second arm 61 having a first free end 610 and a second end cooperating with a second pair of pins 19' forming a guiding fork for the second arm, the second pair of pins 19' being mounted on the stud-holder 10 via a second support 8" and offset angularly relative to the first pair of pins 19 and the stud 8. Thus, the second end 610 of the second arm 61 can slides between the second pair of pins 19'.

The meshing means also comprise a second cam 32 arranged to cooperate with the second arm whose free end 610 rests against the second cam 32.

Elastic constraint means are also associated with the second arm 61, and comprise a rod 64 secured to the second arm 61 and a spring leaf 65 secured to the balance spring stud holder 10, the spring leaf 65 exerting a return force on the rod 64 and exerting an elastic action on the second arm 61 for returning it in position.

The adjustment device 6 also comprises means for adjusting the arms 60, 61, the free end 600, 610 of the first and second arms 60, 61 comprising elastically deformable means for adjusting the length of the arms. The adjustment means are in the form of a spring leaf whose first end is secured to the arm and another end is free, the free end being arranged to be biased and adjust the length of the arms 60, 61, the spring leaf forming a space between it and the free end of each arm. Such an adjustment is necessary depending on the position of the spiral and the correction to be made on the latter.

The means for modifying the active length of the spiral 5 include two pins 19 fastened to the second balance spring stud 8', the second end 601 of the arm 60 being arranged so that it slides between the two pins 19 and comes into contact with the outer coil of the spiral 5 in the correction position and thus modify the active length of the spiral.

The means for modifying the active length of the spiral 5 further comprise two other pins 19' fastened to the third balance spring stud 8", the second end 611 of the second arm 61 being arranged so that it passes between the two pins 19' and comes into contact with the outer coil of the spiral in the correction position.

In addition, each arm 60, 61 comprises means for adjusting the elastic load, the adjustment means being in the form of a screw, the screw passing through the free end of the spring leaf and bearing against the arm. Thus, when the screw is screwed, the free end of the leaf moves away and the distance between the leaf and the free end 600.610 of the arms 60, 61 increases, which allows increasing the length of the arms 60, 61. And vice versa, when the screw is unscrewed, the free end of the leaf gets closer and the distance between the leaf and the free end 600.610 of the arms 60, 61 decreases, allowing decreasing the length of the arms 60, 61.

According to a preferred embodiment, the inertia block 40 is freely mounted in rotation on the axis 41 on which the cams 31, 32 are mounted so that a rotation of the inertia block 40 causes a movement of the arms 60, 61 and simultaneously acts on the means for modifying the active length of the spiral 5. The movement of the arms under the effect of the rotation of the inertia block 40, itself subjected to gravity, is performed between a rest position of the device, and a correction position of the device, each of the arms enabling a separate correction according to the position of the clock. As illustrated in FIGS. 1 to 4, the inertia block 40 consists, for example, of a half-solid disc. In a variant not shown in the figures, the inertia block 40 consists of a solid bi-material disc, the two disc materials having different densities.

Thus, depending on the position of the horological movement 2 in space, the inertia block 40, freely subjected to gravity, can rotate about its axis of rotation and thus cause a movement of the arms 60, 61. In doing so, this rotation of the inertia block 40 acts simultaneously on the means for modifying the active length of the spiral 5, allowing continuously adjusting the active length of the spiral in order to compensate for the disturbances of the isochronism of the balance due to gravity.

In order to avoid the inertia block forming a free wheel, and misadjusting the oscillator 4, 5 instead of correcting it, the adjusting device 6 comprises damping means comprising a gearwheel 34 coaxial with the inertia block and secured to the latter. The damping means comprise a damping device arranged to cooperate with the inertia block via the gearwheel to limit, or prevent, the modification of the active length of the spiral 5 upon a sudden acceleration or deceleration.

As illustrated in the figures, the damping device 20 is in the form of an air damper, the damper comprising a body 22 with a cavity in which a mass 21 with a shape similar to that of the cavity rotates about an axis 24. The axis 24 also comprises a pinion 23 arranged to cooperate with the toothing of the gearwheel 34. Thus, when the inertia block 40 moves, it drives the gearwheel 34 which engages the pinion 23, and makes the weight 21 of the damping device 20 rotate. It should be therefore understood that upon a sharp movement of the inertia block 40, the weight 21 will brake the rotation of the inertia block 40 thanks to the damping device 20. Of course, other types of dampers can be implemented, such as a weight moving in a cylinder, or a magnetic damper.

It should be noted that the shaft 30 bearing the inertia block 40, the gearwheel 34 and the cams 31, 32, also comprises a third heart-shaped cam 33 secured to the shaft 30, and superimposed on the cams 31, 32. The heart-shaped cam 33 is arranged to cooperate with a spring 24, 25 whose end 26 cooperates with the profile of the heart-shaped cam 33, thereby forming a device for resetting the position of the first and second arms 60, 61 to return them to their rest position naturally.

In the preferred embodiment, the device 6 comprises two cams 31, 32 for driving the arms 60, 61. The cams 31, 32 are secured to the shaft 30, angularly offset with respect to each other, and are respectively in contact with the free end 600, 610 of the arms 60, 61.

Figure 3:
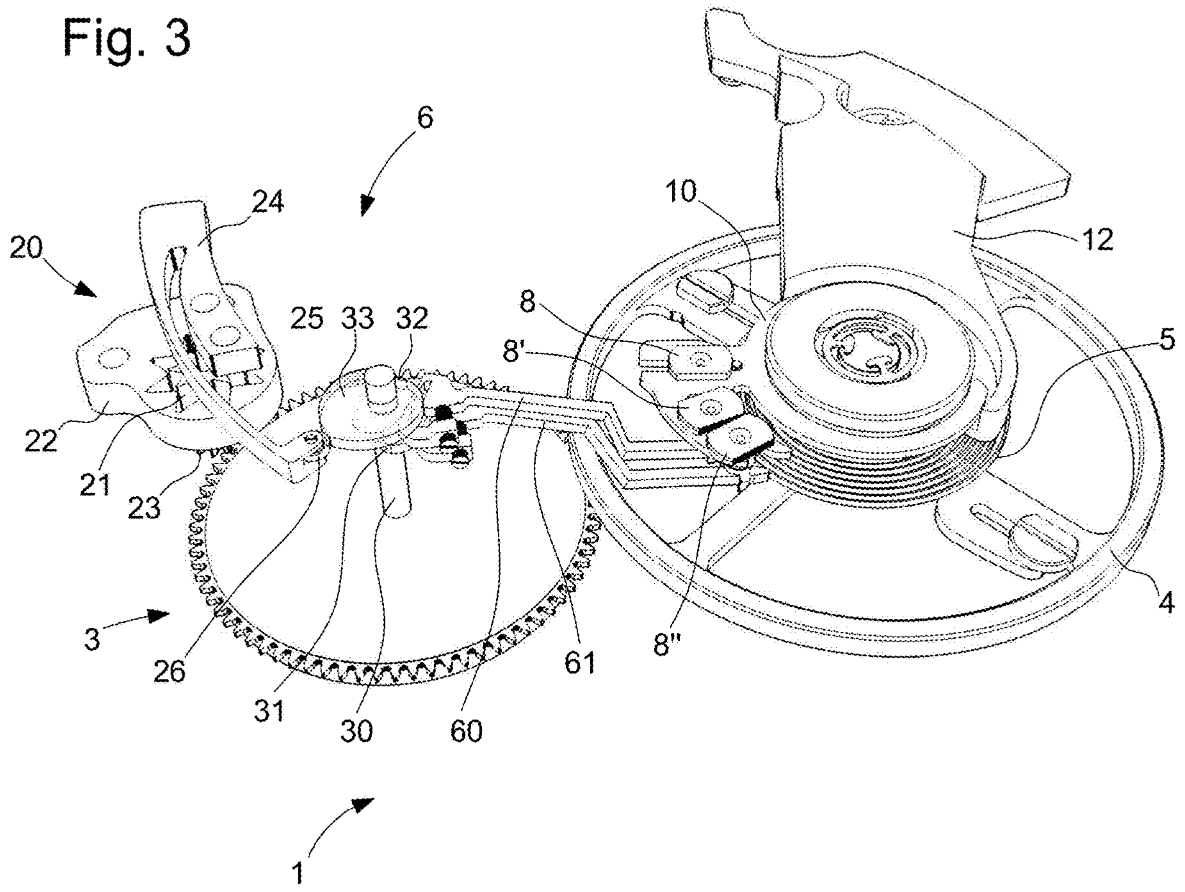
FIG. 3 is a top view of the adjustment device of FIG. 1.
Figure 4:
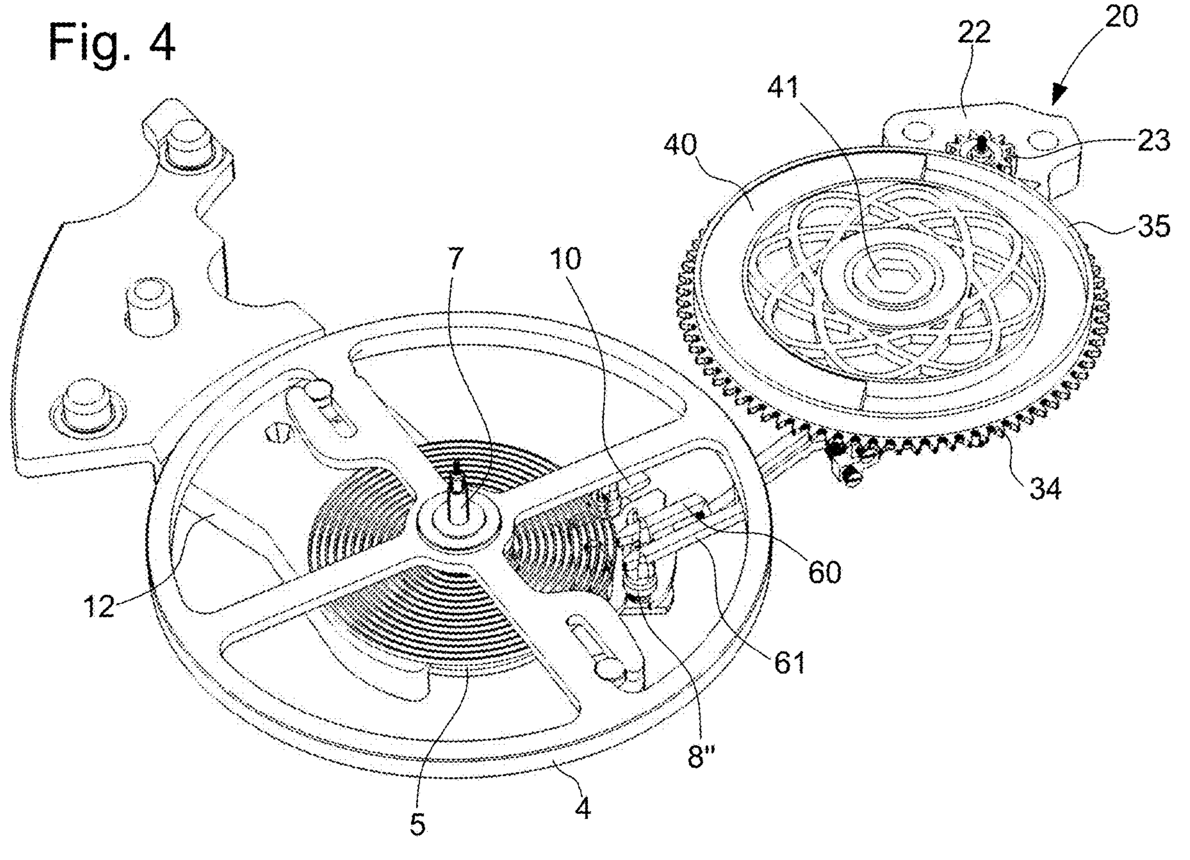
FIG. 4 is a bottom view of the adjustment device of FIG. 1.

Preferably, each cam 31, 32 is a radial cam with an external profile. Although radial cams with a substantially rectangular external profile are shown in FIGS. 1 to 4, in practice the shape considered for the external profile of each cam will depend on the type of spiral 5 used and the correction to be made thereto. For example, a radial cam with a triangular, oblong or oval external profile may also be used in the context of the present invention. Preferably, and as shown in FIGS. 3 and 4, in the rest position of the adjustment device 6, a planar portion of each cam is in contact with an arm 60, 61, whereas in the correction position of the device 6, a wedge or angle of the cam 31, 32 is in contact with the arm 60, 61. Still preferably, as visible in FIGS. 1, 3 and 4, each cam 31, 32 is in contact with its respective arm regardless of the position of the inertia block 40.

It should thus be understood that, depending on the position of the horological movement 2 in space, the inertia block 40, freely subjected to gravity, can rotate about its axis of rotation and thus cause a movement of the arms 60, 61. In doing so, this rotation of the inertia block 40 acts simultaneously on the means for modifying the active length of the spiral 5, allowing continuously adjusting the active length of the spiral in order to compensate for the disturbances of the isochronism of the balance due to gravity. The rotation of the inertia block 40 causes a rotation of the shaft 30 and has the effect of moving the cams 31, 32 which are secured to the shaft, the cams then acting on the free end 600, 610 of the arms 60, 61 and moving at least one of the arms 60, 61 so that the second end of one of the arms comes into contact with the spiral 5 so as to modify the active length of the spiral 5.

Once the inertia block is stabilised following a change of its position, the device will automatically return to the rest position thanks to the action of the spring 24, 25 on the heart-shaped cam 33 which is also secured to the shaft 31.

The invention also relates to a horological movement 2 including an oscillator 4, 5 of the balance-spiral type and a device 6 for autonomous adjustment of the active length of the spiral 5 as described before.

The invention also relates to a timepiece 1 including a horological movement 2 equipped with a device 6 for autonomous adjustment of the active length of the spiral 5 as described before.

The invention claimed is:

1. A device for autonomous adjustment of the active length of a spiral, for oscillators of the balance-spiral type, comprising a cock mounted on a plate of a horological movement and in which a shaft of a balance pivots, the spiral including an inner end secured to the shaft of a balance and an outer end secured a first balance spring stud fastened to a balance spring stud holder, the balance spring stud holder being pivotably mounted on the cock concentrically to the shaft of the balance, and means for modifying the active length of the spiral;

wherein the means for modifying the active length of the spiral comprise:

at least one arm capable of moving between a rest position and a correction position of the device, the at least one arm having a first free end and a second end cooperating with a first pair of pins mounted on the balance spring stud holder, the first pair of pins being angularly offset with respect to the balance spring stud;

elastic biasing means configured to exert an elastic action on the at least one arm to return the at least one arm in position;

an inertia block movable in rotation around a shaft on which at least a first cam is mounted, the inertia block being arranged to rotate freely around the shaft according to gravity, the rotation of the inertia block causing a rotation of the at least first cam and a movement of the at least one arm to act on the spiral and simultaneously modify the active length of the spiral;

damping means comprising a gearwheel coaxial with the inertia block and mounted on the inertia block, and a damping device arranged to cooperate with the inertia block via the gearwheel and limit the modification of the active length of the spiral in the event of a sudden acceleration or deceleration.

2. The device for autonomous adjustment of the active length of a spiral according to claim 1, further comprising a second arm capable of moving between the rest position and the correction position of the device, the second arm having a first free end and a second end cooperating with a second pair of pins mounted on the balance spring stud holder, the second pair of pins being angularly offset with respect to the first pair of pins and to the balance spring stud, and the elastic biasing means being configured to exert an elastic action on the second arm to return it in position.

3. The device for autonomous adjustment of the active length of a coil according to claim 2, further comprising a second cam arranged to cooperate with the second arm.

4. The device for autonomous adjustment of the active length of a spiral according to claim 3, wherein the cams are radial cams with an external profile.

5. The device for autonomous adjustment of the active length of a spiral according to claim 3, wherein the cams are angularly offset with respect to one another by an angle greater than 90°.

6. The device for autonomous adjustment of the active length of a spiral according to claim 1, wherein, in the rest position of the device, a planar portion of each cam is in contact with the at least one arm (60, 61), and, in the correction position of the device, a wedge or angle of the cam is in contact with the at least one arm.

7. The device for autonomous adjustment of the active length of a spiral according to claim 2, wherein the cams are in permanent contact with the free end of each arm regardless of the position of the inertia block.

8. The device for autonomous adjustment of the active length of a coil according to claim 1, wherein the free end of the first arm comprises elastically deformable adjustment means in the form of a spring leaf whose first end is secured to the arm and another end is free, the free end being arranged to be biased and adjust the length of the first arm.

9. The device for autonomous adjustment of the active length of a coil according to claim 1, wherein the free end of the second arm comprises elastically deformable adjustment means in the form of a spring leaf whose first end is secured to the arm and another end is free, the free end being arranged to be biased and adjust the length of the second arm.

10. The device for autonomous adjustment of the active length of a spiral according to claim 9, further comprising means for adjusting the elastic load in the form of a screw, the screw passing through the free end and bearing against the arm.

11. The device for autonomous adjustment of the active length of a spiral according to claim 1, wherein the first pair of pins is fastened to the balance spring stud holder via a first support, the arm being arranged to slide between the two pins and comes into contact with the outer coil of the spiral in the correction position.

12. The device for autonomous adjustment of the active length of a spiral according to claim 1, wherein the second pair of pins is fastened to the balance spring stud holder via a second support, the arm being arranged to pass between the two pins and comes into contact with the outer coil of the spiral in the correction position.

13. The device for autonomous adjustment of the active length of a spiral according to claim 1, wherein the inertia block is a solid half-disc.

14. The device for autonomous adjustment of the active length of a spiral according to claim 1, wherein the damping device comprises an air damper, the damper being in the form of a body with a cavity having a shape similar to that of the inertia block, the inertia block being arranged to pivot into the cavity.

15. The device for autonomous adjustment of the active length of a spiral according to claim 1, further comprising a third heart-shaped cam (33) mounted on the shaft, the heart-shaped cam being arranged to cooperate with a spring (24, 25), the heart-shaped cam and the spring forming an assembly for resetting the position of the first and second arms (60, 61).

16. The device for autonomous adjustment of the active length of a spiral according to claim 15, wherein the third heart-shaped cam is superimposed on the at least one cam.

17. A horological movement including an oscillator of the balance-spiral type and the autonomous adjustment device for independent adjustment of the active length of the spiral according to claim 1.

18. A timepiece (1) including the horological movement, according to claim 17.

* * * * *